(12) United States Patent
Wise et al.

(10) Patent No.: US 9,493,635 B2
(45) Date of Patent: Nov. 15, 2016

(54) NANOCOMPOSITES FROM STABLE DISPERSIONS OF CARBON NANOTUBES IN POLYMERIC MATRICES USING DISPERSION INTERACTION

(75) Inventors: Kristopher Eric Wise, Hampton, VA (US); Cheol Park, Yorktown, VA (US); Jin Ho Kang, Yorktown, VA (US); Emilie J. Siochi, Newport News, VA (US); Joycelyn S. Harrison, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1084 days.

(21) Appl. No.: 11/644,019

(22) Filed: Dec. 22, 2006

(65) Prior Publication Data

US 2008/0275172 A1    Nov. 6, 2008

Related U.S. Application Data

(60) Provisional application No. 60/834,529, filed on Jul. 31, 2006.

(51) Int. Cl.
    *B82Y 30/00*       (2011.01)
    *C08K 7/24*        (2006.01)

(52) U.S. Cl.
    CPC .................. *C08K 7/24* (2013.01); *B82Y 30/00* (2013.01); *C08K 2201/011* (2013.01)

(58) Field of Classification Search
USPC ....... 252/62.9 R, 500, 511; 257/40; 310/319; 428/44, 323, 364, 391, 403, 423.1, 428/446, 447, 457, 458, 461, 473.5, 474.4, 428/480, 500, 522, 524, 688; 523/200; 524/401, 403, 404, 405, 409, 431, 538, 524/493, 495, 496, 497, 537, 556, 557, 588, 524/589, 602; 977/742
See application file for complete search history.

(56) References Cited

U.S. PATENT DOCUMENTS

| | | | |
|---|---|---|---|
| 7,402,264 | B2 * | 7/2008 | Ounaies et al. .............. 252/511 |
| 7,972,536 | B2 | 7/2011 | Connell et al. |
| 2003/0158323 | A1 | 8/2003 | Connell et al. |
| 2004/0016912 | A1 * | 1/2004 | Bandyopadhyay et al. .. 252/500 |
| 2004/0131859 | A1 * | 7/2004 | Yerushalmi-Rozen et al. ............................ 428/408 |
| 2004/0132072 | A1 * | 7/2004 | Zheng et al. ..................... 435/6 |
| 2005/0038167 | A1 | 2/2005 | Plummer et al. |
| 2005/0238889 | A1 | 10/2005 | Iwamoto et al. |
| 2006/0057361 | A1 * | 3/2006 | Ounaies et al. .............. 428/323 |
| 2006/0240238 | A1 * | 10/2006 | Boussaad et al. ......... 428/293.4 |
| 2006/0270777 | A1 * | 11/2006 | Wise et al. ..................... 524/496 |

FOREIGN PATENT DOCUMENTS

WO    WO 03/040026     * 5/2003

* cited by examiner

*Primary Examiner* — Ling Choi
*Assistant Examiner* — Thuy-Ai Nguyen
(74) *Attorney, Agent, or Firm* — Robin W. Edwards; Jennifer L. Riley

(57) ABSTRACT

Stable dispersions of carbon nanotubes (CNTs) in polymeric matrices include CNTs dispersed in a host polymer or copolymer whose monomers have delocalized electron orbitals, so that a dispersion interaction results between the host polymer or copolymer and the CNTs dispersed therein. Nanocomposite products, which are presented in bulk, or when fabricated as a film, fiber, foam, coating, adhesive, paste, or molding, are prepared by standard means from the present stable dispersions of CNTs in polymeric matrices, employing dispersion interactions, as presented hereinabove.

11 Claims, 2 Drawing Sheets

Normal Dispersion Interaction

Initial State

Spontaneous Fluctuation on B

Induced Dipole on A

Enhanced Dispersion Interaction

Initial State

Electron Donation From B* to A*

Spontaneous Fluctuation on B*

Induced Dipole on A*

NANOCOMPOSITES FROM STABLE DISPERSIONS OF CARBON NANOTUBES IN POLYMERIC MATRICES USING DISPERSION INTERACTION

CROSS REFERENCE TO RELATED APPLICATION

This application claims the benefit of U.S. Provisional Application No. 60/834,529 filed on Jul. 31, 2006 for "Stable Dispersions of Carbon Nanotubes in Polymer Matrices Using Dispersion Interaction".

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

BACKGROUND OF THE INVENTION

1. Field of the Invention

This invention relates generally to nanocomposites prepared from dispersions of carbon nanotubes (CNTs) in polymeric matrices. It relates particularly to stable dispersions of carbon nanotubes (CNTs) in polymeric matrices employing dispersion interaction, as well as to nanocomposites prepared from these stable dispersions.

2. Description of Related Art

Production of CNT/polymer nanocomposites continues to be hampered by the lack of a reliable method for dispersing the nanotubes in the polymer matrix. As-produced nanotubes exist in bundles of tens or hundreds of individual tubes which are held together by van der Waals interactions. While individual van der Waals interactions are fairly weak, when summed over all of the carbon atoms comprising a nanotube, the cumulative interaction is quite strong, on the order of 1 eV per nanometer of adjacent nanotubes. To achieve the desired properties of CNT/polymer composites, it is important to be able to disperse the tubes individually or in few tube bundles. The problem involves creating stable dispersions in this size regime.

Prior to the innovation described herein, we are aware of no existing method for achieving sufficiently stable dispersions of CNTs for nanocomposite applications without additives such as surfactants or employing chemical modification to the carbon nanotubes. Prior work generally produced metastable dispersions by mechanically mixing nanotubes with polymers using a combination of traditional high shear flow processing techniques and sonication.

A qualitatively different approach to this problem involves the formation of covalent bonds between the matrix polymer and the dispersed CNTs by chemically functionalizing the CNTs. While this approach can indeed produce stable nanocomposites, it has the significant disadvantage of disrupting the extended pi electron system of the CNTs. It is this feature of CNTs which is responsible for their exceptional mechanical and electronic properties. Multifunctionality cannot generally be achieved with chemically functionalized CNTs.

The nanocomposites produced using prior methods are characterized by their metastability. By this we mean that while they might have existed as well dispersed mixtures for some short period of time (days or weeks), the suspended nanotubes eventually reaggregate into larger bundles. The reaggregation process occurs either over time in solution or immediately during common processing operations such as drying or curing. This inevitably leads to reductions in the mechanical and multifunctional properties of the composites.

BRIEF SUMMARY OF THE INVENTION

It is accordingly the primary object of the present invention to avoid the inadequacies of the related art and provide what is not available therein, viz: (1) stable dispersions of carbon nanotubes (CNTs) in polymeric matrices, without employing additives such as surfactants, or utilizing covalent attachment of the CNTs to the matrices by means of chemical functionalization of the CNTs; and (2) stable nanocomposites wherein the suspended CNTs do not reaggregate into larger bundles, which would result in reduced mechanical and multifunctional properties of the nanocomposites.

This primary object, as well as its attending benefits, are achieved by first providing a dispersion of CNTs in a polymeric matrix, wherein the dispersion includes CNTs dispersed in a host polymer or copolymer whose monomers have delocalized electron orbitals, so that a dispersion interaction results between the host polymer or copolymer and the CNTs dispersed therein. This dispersion is eminently stable, in contradistinction to similar dispersions of the related art.

Such a dispersion interaction advantageously results when the monomers of the host polymer or copolymer include: an aromatic moiety, e.g., a phenyl ring or derivatives thereof; or a multiple phenyl ring or derivatives thereof. In the latter instance, beneficial results are obtained if the aromatic moiety is one or more of naphthalenyl and anthracenyl.

It has also been discovered that the dispersion force of the dispersion interaction can be further augmented and controlled by introducing electron donors or electron acceptors in the aromatic moiety of the polymer or copolymer of the polymeric matrix employed. Accordingly, the host polymer or copolymer advantageously additionally includes electron-donating or electron-accepting functional groups, which have been introduced in the aromatic moiety of the monomers of the host polymer or copolymer, or directly in the aromatic moiety of the host polymer or copolymer itself.

The present invention also comprehends a nanocomposite product, which is presented in bulk, or when fabricated as a film, fiber, foam, coating, adhesive, paste, or molding. Such a nanocomposite product is prepared by standard means known in this art from the instant stable dispersions of carbon nanotubes in polymeric matrices employing dispersion interaction, as detailed hereinabove.

The instant nanocomposite product is advantageously employed as a matrix for matrix composites with reinforcing inclusions such as fibers, particulates, powders and platelets including carbon fibers, glass fibers, organic fibers, and combinations thereof.

BRIEF DESCRIPTION OF THE SEVERAL VIEWS OF THE DRAWINGS

For a more complete understanding of the present invention, including its primary object and attending benefits, reference should be made to the Detailed Description of the Present Invention, which is set forth immediately below.

This Detailed Description should be read in the light of the accompanying Drawings, wherein.

DETAILED DESCRIPTION OF THE INVENTION

The essence of this work is the formation of a dispersion interaction, especially an enhanced dispersion interaction between a host polymer matrix and the carbon nanotubes (CNTs) dispersed therein. The CNTs employed in the present invention are presently readily available commercially. They may be single-walled carbon nanotubes (SWNTs), double-walled carbon nanotubes (DWNTs), few-walled carbon nanotubes (FWNTs, i.e., those having from about 3 to about 10 walls, as understood by those of skill in this art), or multi-walled carbon nanotubes (MWNTs, i.e., those having greater than about 10 walls, as understood by those of skill in this art.)

Figure 1:
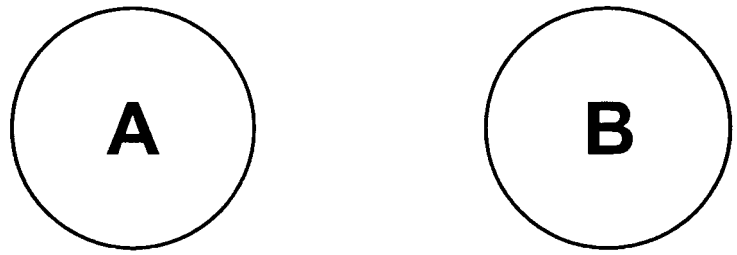
FIG. 1 is a schematic illustrating a standard dispersion interaction (induced dipole-induced dipole interaction) according to the present invention, which is a weak intermolecular force arising from the attractive interaction between dipoles transciently induced between entities A and B.
Figure 1:
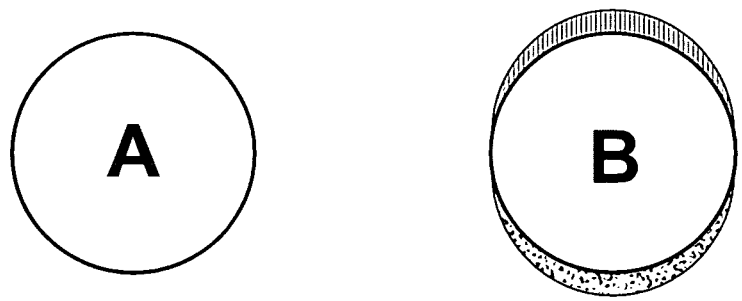
Figure 1:
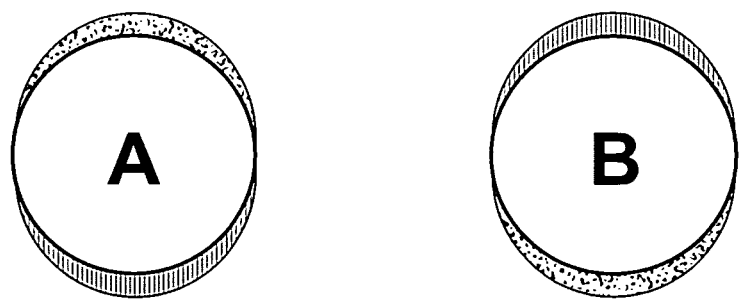

The dispersion interaction is a weak intermolecular force that arises from the attractive interaction between transiently induced dipoles. Referring to FIG. 1, consider two molecular entities as A and B and assume that an instantaneous and spontaneous fluctuation in the electron density distribution on A has occurred. This fluctuation will cause the electron density on B to rearrange in such a way as to minimize the electrostatic energy of the two charge distributions, which may be shown to be a dipolar distribution of charge. Molecule A will now respond to the dipolar charge distribution on B by rearranging its electron distribution to minimize the total electrostatic energy. The preferred arrangement is also dipolar. These two induced dipole moments are now in a favorable arrangement and the net effect is a stabilizing electrostatic interaction between A and B (See bottom two entities in FIG. 1). Different shades for the induced dipoles indicate different polarities resulting in electrostatic interaction. These induced dipole-induced dipole interactions are variously referred to as dispersion interactions, London forces, and van der Waals forces. The magnitude of this dispersion interaction is proportional to the polarizability of the electron density distribution, and thus is larger for polymers whose monomers have larger, delocalized electron orbitals.

Aromatic moieties such as the phenyl ring or its derivatives are used in the present invention when dispersion interactions are desired, because it features six pi electrons which are delocalized over the six member ring structure. Fusing multiple phenyl rings to form larger molecules such as naphthalene (two rings) or anthracene (three rings) increases the polarizability further, due to the presence of more mobile electrons, which may move over a larger nuclear framework. The limiting cases of these fused ring structures are the graphene sheet and carbon nanotubes, which are essentially rolled-up graphene sheets. When molecules with aromatic moieties are located in the vicinity of the surface of a carbon nanotube, transient dipoles are induced between the nanotube surface and the aromatic polymer, resulting in a significant dispersion attraction. These dispersion forces aid in producing a stable and uniform carbon nanotube dispersion in a polymer matrix.

Figure 2:
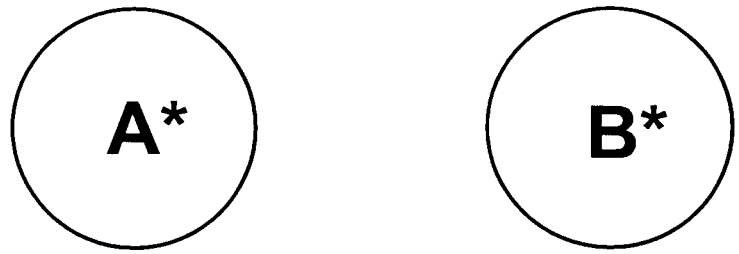
FIG. 2 is a schematic illustrating an enhanced dispersion interaction according to the present invention, wherein electron density transferred to entity A* from entity B* (electron donor) is more weakly bound and more polarizable. The spontaneous dipole formed on B* induces a larger dipole on A*, resulting in a greater dispersion interaction.
Figure 2:
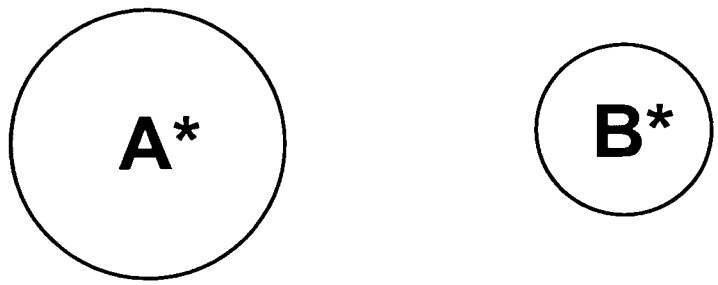
Figure 2:
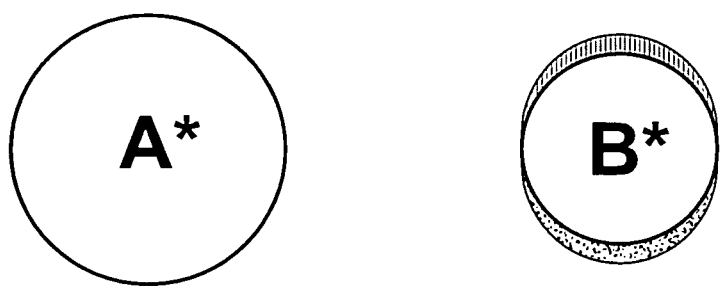
Figure 2:
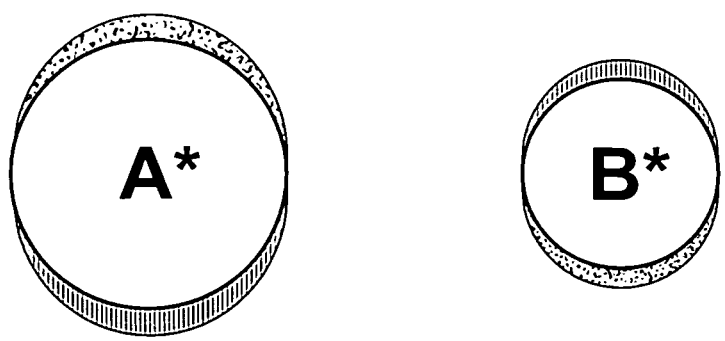

The dispersion force is further augmented by introducing electron donors or acceptors in the aromatic moiety of the monomer of the polymeric material. To understand this phenomenon, refer to FIG. 2 and first consider the case in which aromatic moiety (B*) contains a functional group which gives it electron donating character relative to SWNT (A*). In this situation, charge will be donated from aromatic moiety (B*) to nanotube (A*), which results in partial occupation of the conduction band energy levels of the nanotube. This newly added electron density will be less tightly bound and therefore more polarizable than the pre-existing electron density. The magnitude of the dipole moment which will be induced on this now overcharged nanotube is larger, as is the magnitude of the dispersion interaction that will result. This augmented stabilizing electrostatic interaction between A and B is shown in the bottom two entities in FIG. 2. In the opposite case, functionalizing the aromatic moiety with an electron accepting group will result in withdrawal of electron density from the nanotube into the lowest unoccupied molecular orbitals of the aromatic. As in the first case, this increment in electron density will increase the polarizability of the aromatic and enhance the magnitude of the induced dipole-induced dipole dispersion interaction. The magnitude of the effect is smaller in the second case due to the smaller size of the aromatic moiety relative to the nanotube. A great deal of flexibility and tunability is thereby achievable by careful selection of the aromatic moiety of the molecules, monomers, or polymers of interest.

It has been observed that SWNTs disperse readily in aromatic polymers or copolymers with an aromatic unit. For example, while SWNTs are dispersed to a limited extent in the nonaromatic polymer PMMA (polymethyl methacrylate), a more uniform and stable dispersion is achievable in co-PMMA/PS copolymer due to the presence of the aromatic PS (polystyrene) moiety of the copolymer. Both high resolution SEM (scanning electron microscopy) and small angle neutron scattering show a more uniform dispersion of SWNTs in PMMA/PS than in PMMA matrix. These results are confirmed by mechanical testing, the results of which show that while the tensile modulus of SWNT/PMMA composite increased moderately from 2.24 GPa to 2.48 GPa at 5 wt % SWNT loading, that of SWNT/co-PMMA/PS increased from 2.46 GPa to 2.88 GPa even at 0.5 wt % SWNT loading. Furthermore, thermal characterization showed that the glass transition temperature (Tg) of SWNT/PMMA increased by 13° C. at 5 wt % SWNT loading, while that of SWNT/co-PMMA/PS increased by 20° C. at 0.5 wt % SWNT loading. The more effective mechanical and thermal reinforcement of c-PMMA/PS is due to the more complete dispersion of SWNT in the copolymer with the aromatic moiety.

Additional examples of this effect are found with biopolymers. When aromatic polypeptides were employed as a matrix for SWNTs, uniform dispersions were achieved. A copolypeptide with an aromatic amino acid unit (co-Leucine/Phenylalanine) was used to disperse SWNTs and resulted in a stable, uniform dispersion by simple mixing with a magnetic stirrer. Tensile tests revealed that all mechanical properties increased significantly with the addition of SWNT, again due to the good dispersion resulting from the favorable interaction between SWNTs and the aromatic phenylalanine unit. At 5 wt % loading, 52%, 250%, and 41% increases were observed in the Young's modulus, yield strength, and percent elongation at break, respectively, compared to the pristine polymer. Both electrical and dielectric properties also increased significantly. Another synthetic polypeptide, PBLG (poly(benzyl-L-glutamate), is a commercially available polymer with an aromatic moiety in each repeat unit. This polypeptide also formed a stable, uniform dispersion with SWNTs by simple mixing with a magnetic stir bar. Cast films of SWNT/PBLG showed effective mechanical and electrical reinforcement with SWNT addition.

Final examples are the aromatic polyimides, which are found to disperse SWNTs better than alkyl polyimides. In one case, the aromatic polyimide PMDA-ODA was polymerized in-situ with SWNTs. The nanocomposite showed excellent mechanical reinforcement in both modulus and strength, along with a significant increase in electrical and dielectric properties. When strong electron withdrawing groups are introduced in the aromatic polyimide, the dispersion interaction is augmented, as describe above. For example, (beta-CN)APB/ODPA was mixed with SWNT and found to form a more stable and uniform SWNT dispersion than other aromatic polyimides without electron accepting functional groups on the aromatic moieties.

The present invention is noteworthy, because:
Dispersions of SWNTs in polymer matrices using dispersion interactions yield well dispersed nanocomposites with excellent stability.
No reaggregation of SWNTs has been observed after long periods of time. Since covalent bonds are not formed, electrical and mechanical properties of the SWNTs are not disturbed.
Nanocomposites produced using this method demonstrate significant mechanical, electrical, and dielectric property improvements relative to the pure polymer systems.

Given the enormous potential market for nanocomposite materials in such fields as aerospace, automotive and microelectronics, among many others, this development is significant. In light of the lack of success of other competing methods for preparing stable nanocomposite materials, the method described herein offers a unique opportunity for commercial exploitation. This simple dispersion approach, which is accomplished without damaging of the SWNTs, enables mass production of multifunctional nanocomposites by judiciously selecting a polymer matrix (either donor or acceptor) or by adding either a donor or an acceptor functional group in the monomer unit of the given polymer matrix.

We claim:

1. A stable dispersion of carbon nanotubes (CNTs) in a polymeric matrix for use as a nanocomposite, comprising CNTs dispersed thermodynamically in a host copolypeptide at a high enough concentration such that the resulting nanocomposites are electrically conductive, show at least about a 52% increase in Young's Modulus, at least about a 250% increase in yield strength, and at least about a 41% increase in percent elongation at break, wherein the copolypeptide comprises an aromatic unit and a non-aromatic unit, and wherein donor-acceptor interactions are tuned to result in an induced dipole dispersion interaction between the host copolypeptide and the CNTs dispersed therein.

2. The dispersion of claim 1 wherein the aromatic unit comprises a phenyl ring or a derivative thereof.

3. The dispersion of claim 1 wherein the aromatic unit is an aromatic amino acid, and the non-aromatic unit is a non-aromatic amino acid.

4. The dispersion of claim 3, wherein the aromatic amino acid is Phenylalanine, and the non-aromatic amino acid is Leucine.

5. The dispersion of claim 1, wherein the host copolypeptide additionally comprises electron-donating or electron-accepting functional groups which have been introduced in an aromatic moiety of the aromatic unit.

6. A nanocomposite prepared from the dispersion of claim 1.

7. A nanocomposite prepared from the dispersion of claim 4.

8. A nanocomposite prepared from the dispersion of claim 5.

9. The nanocomposite of claim 6 which is a film.
10. The nanocomposite of claim 7 which is a film.
11. The nanocomposite of claim 8 which is a film.

* * * * *